Nov. 3, 1964 S. O. FENKEL 3,155,303
MEAT PACKAGING TRAY
Filed Jan. 31, 1962 3 Sheets-Sheet 1
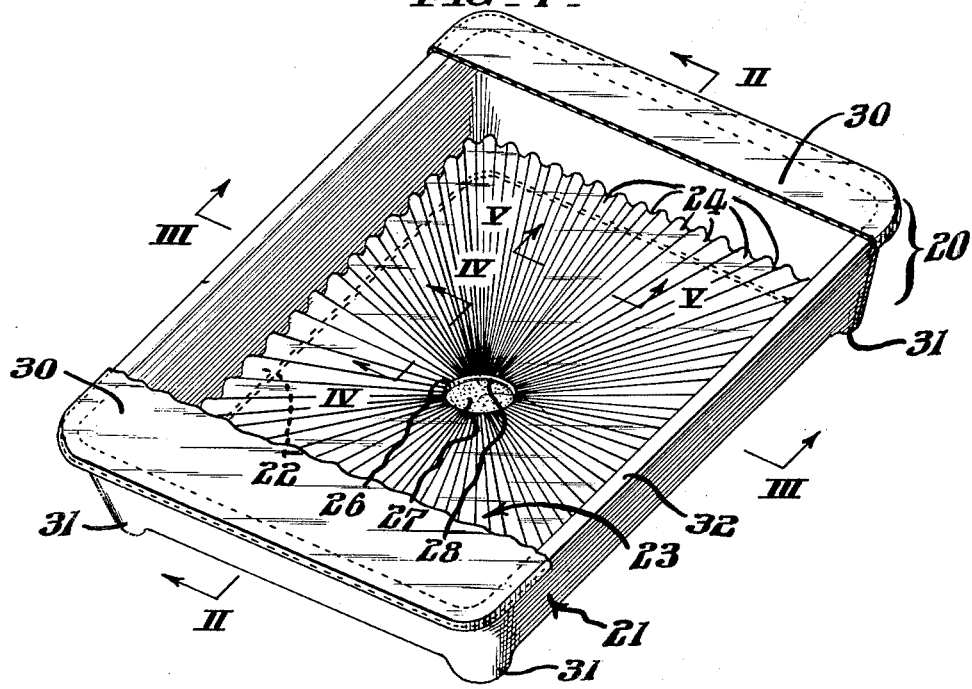
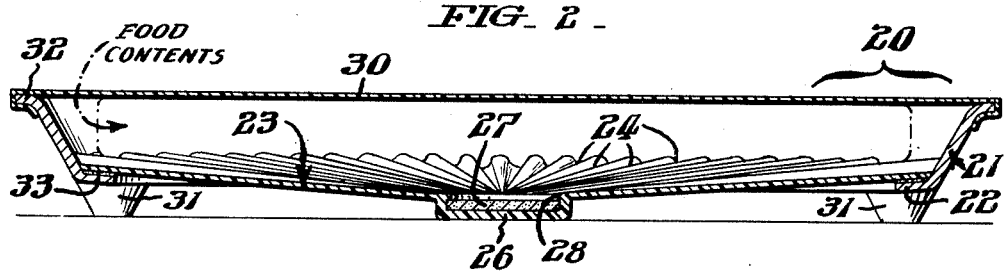
 
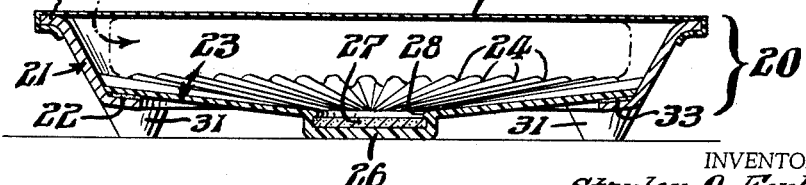
INVENTOR.
Stanley O. Fenkel,
BY
Paul & Paul
ATTORNEYS.

Nov. 3, 1964
S. O. FENKEL
3,155,303
MEAT PACKAGING TRAY
Filed Jan. 31, 1962
3 Sheets-Sheet 2
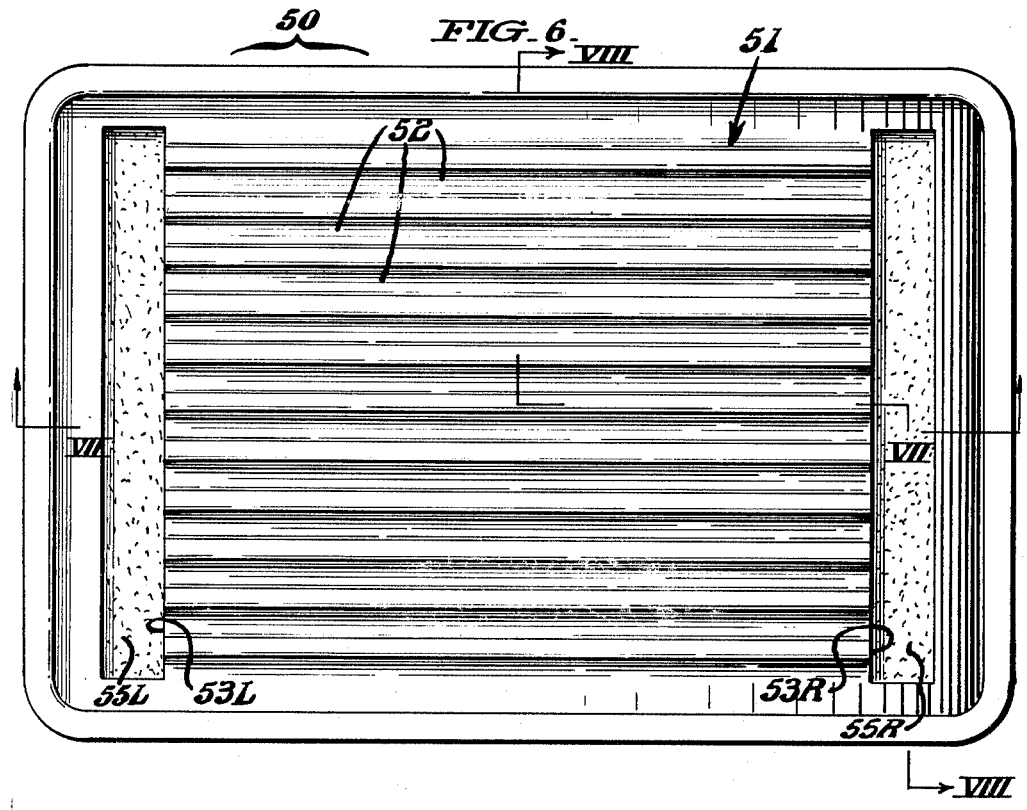
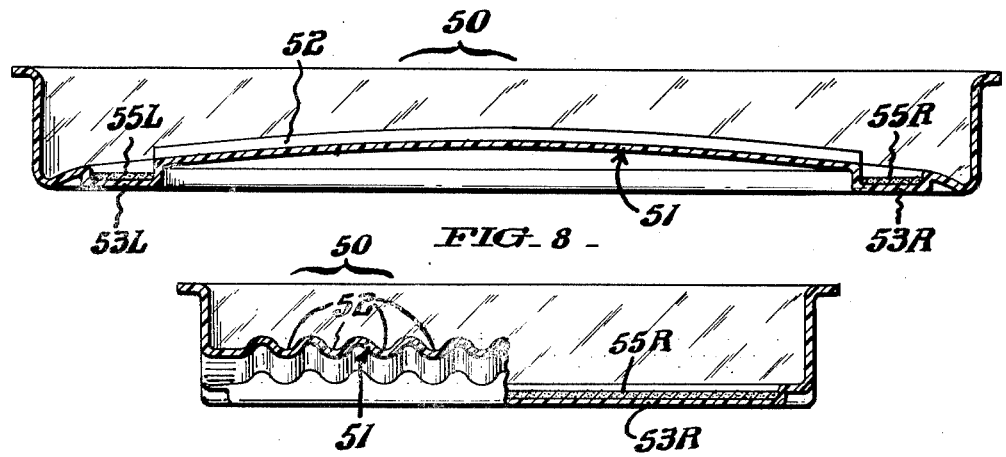
INVENTOR.
Stanley O. Fenkel,
BY
Paul & Paul
ATTORNEYS.

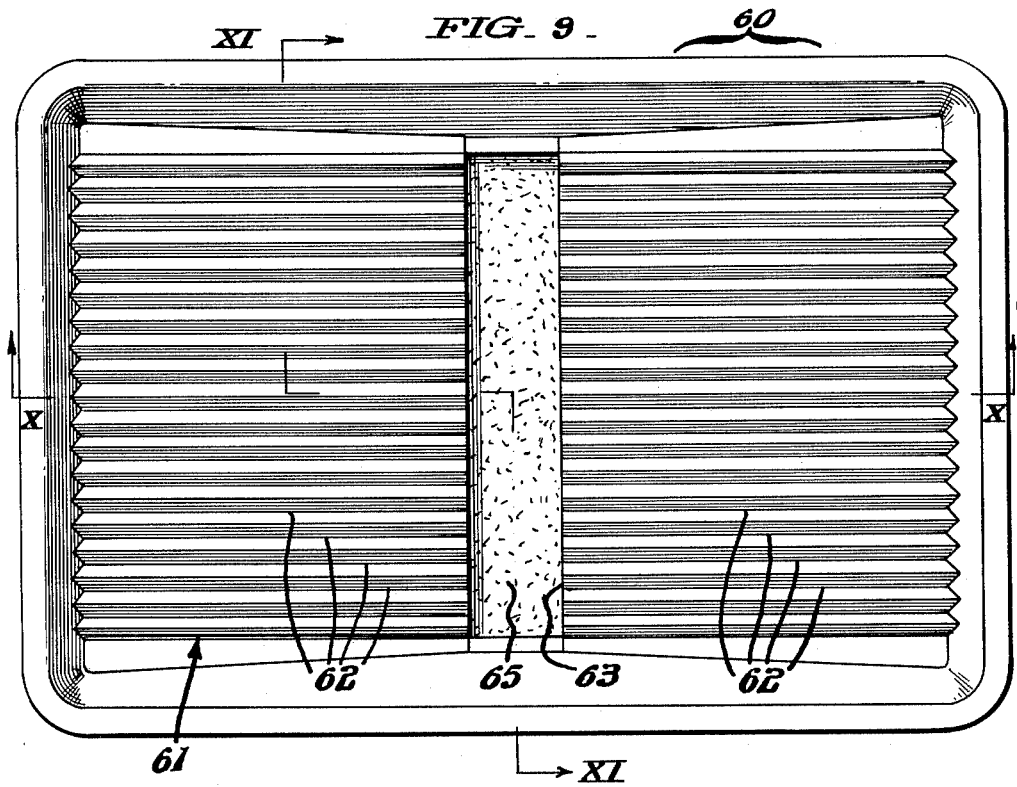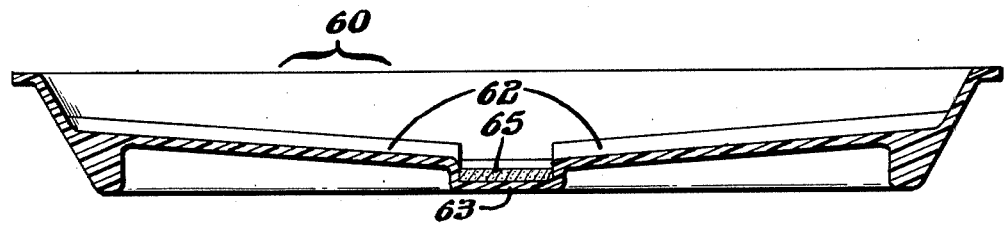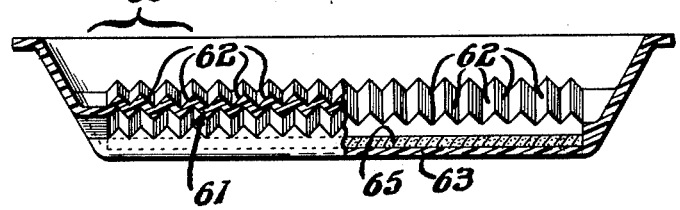

United States Patent Office 3,155,303
Patented Nov. 3, 1964

3,155,303
MEAT PACKAGING TRAY
Stanley O. Fenkel, 4721 Walnut St., Philadelphia, Pa., assignor of one-half to Fred Minikes, New Rochelle, N.Y.
Filed Jan. 31, 1962, Ser. No. 172,047
2 Claims. (Cl. 229—2.5)

This application is a continuation-in-part of my earlier application, Serial No. 160,441, filed December 19, 1961, entitled "Meat Packaging Tray."

This invention relates to food packaging. It relates particularly to a disposable packaging tray for food products, particularly for meats and poultry. In the description which follows, it will be convenient to refer to the tray as a tray for meats but it is to be understood that the tray may also be used for poultry and other food products.

It has become customary, particularly in the large supermarkets, to place meats pre-wrapped in package form in refrigerated display cases where they may be inspected and selected or rejected by the customer.

The meat is customarily placed on a cardboard tray or slab, then wrapped as a unit using transparent plastic film, and then heat sealed. The package thus formed is later placed on display in a refrigerated display case. The wrapping is customarily done at room temperature in a non-refrigerated area and ordinarily some time elapses (for example, 20 to 30 minutes) before the wrapped meats are placed in the refrigerated display case. During that time, some of the meat juices, bloody and fatty liquids, and the like, are pressed from the meat during handling of the package or are otherwise caused to exude from the meat. These juices and liquids fall to the floor of the cardboard tray or slab and it becomes discolored and also soggy, losing its rigidity. In the cold temperature of the refrigerated display cabinet the juices and liquids which have collected on the tray or slab, or have been absorbed by it, are congealed but the congealed material remains to detract from the appearance of the package and thus impair its saleability.

More recently, trays formed out of thin transparent plastic material have come into use for the packaging of meats, and while such plastic trays do not become soggy since they do not absorb the meat juices and other liquids, such trays do become unattractive in appearance. The liquid materials which congeal on the floor of the tray are even more plainly visible than in the case of a cardboard tray, since, when the package is turned over by the customer during inspection, the congealed material is readily visible through the transparent tray.

Since a clean and attractive appearance is important to the saleability of the item, it is customary to rewrap packaged meats which have become unattractive by reason of discoloration of the tray, or, in the case of cardboard trays, which have become soft and soggy.

An important object of my present invention is to provide an improved disposable tray useful for the display and sale of packaged meats, poultry and other products.

A more specific object of my invention is to provide, for use in the display and sale of meats, poultry and other food items, a tray which remains relatively free of the discoloration which characterizes the prior art trays caused by the fall onto the tray of the meat juices, blood, fatty liquids and other liquid materials which are pressed or exuded from the meats, poultry, or other products during and after wrapping and which become congealed in the cold temperatures of a refrigerated displayed counter.

Another object is to provide a tray having the features set forth hereinabove which does not absorb the juices or other liquids which fall onto the tray.

Still another object is to provide a tray having the foregoing features which is transparent and attractive in appearance.

These and other objects of my present invention will become clear from a consideration of the following detailed description of several preferred forms of my invention selected for illustration in the drawing in which:

FIG. 1 is a perspective view of one form of my improved tray;

FIG. 2 is an elevational view in section along the line II—II of FIG. 1;

FIG. 3 is an elevational view in section along the line III—III of FIG. 1;

FIGS. 4 and 5 are views in cross-section along the lines IV—IV and V—V respectively, of FIG. 1;

FIG. 6 is a plan view of a second form of my improved tray;

FIG. 7 is an elevational view in section along the line VII—VII of FIG. 6;

FIG. 8 is an elevational view in staggered section along the line VIII—VIII of FIG. 6;

FIG. 9 is a plan view of a third form of my improved tray;

FIG. 10 is an elevational view in section along the line X—X of FIG. 9; and

FIG. 11 is an elevational view in staggered section along the line XI—XI of FIG. 9.

In describing the preferred embodiments of the invention illustrated in the drawing, specific terminology has been resorted to for the sake of clarity. However, it is to be understood that it is not my intention to be limited to the specific terms so selected, and that each specific term includes all technical equivalents which operate in a similar manner to accomplish a similar purpose.

In FIG. 1 of the drawing, the tray 20 is illustrated as being comprised of a generally rectangular open-bottom frame 21 and a bottom insert 23. Frame 21 may preferably be a cardboard stamping having hollow feet 31, one at each of its four corners, and having an upper peripheral lip 32. The bottom insert 23 may preferably be formed out of thin (.008") transparent plastic film, preferably polystyrene. Bottom insert 23 may be secured, as by cement 33, to the bottom flange 22 of the cardboard frame 21. Additionally, alternatively, bottom insert 23 may be pressed, at each of the four feet 31, into the depression formed by the hollow feet.

Cardboard frame 21 provides the necessary rigidity to the tray. If rigidity is not a necessary or desirable characteristic, then the entire tray may be formed (as by vacuum forming) in one piece out of thin transparent plastic material similar to that of which bottom insert 23 is formed in the illustrated embodiment. Even where rigidity is necessary, the plastic member may comprise a complete tray, rather than just a bottom insert, i.e. the plastic bottom member may have side walls formed to be fitted over the cardboard frame 21. In this form, it may be unnecessary to cement the plastic member to the frame 21.

In accordance with one form of my present invention, as illustrated in FIGS. 1–3, and irrespective of whether the plastic member has the form of a complete tray for use alone or in combination with a cardboard frame or whether the plastic member is a bottom insert such as 23, the bottom of the plastic member is provided with a centrally disposed well 26 and with a plurality of radially-disposed troughs leading to and inclined downwardly toward the well 26. In the form illustrated in the drawing, the bottom insert 23 is formed of a radially-disposed troughs leading to and inclined downwardly toward the well 26. In the form illustrated in the drawing, the bottom insert 23 is formed of a radially-disposed corrugations, and is dished slightly downward toward the centrally disposed well 26. A pad 27 of liquid-absorbing material is placed in the well 26. The well 26 may preferably be circular in cross section and provided with an inwardly-extending retaining flange 28 for retaining the pad of absorbent material.

The advantage of my improved tray will now become clear. When, for example, the meat is placed in the tray and the package is wrapped with a transparent plastic-film cover 30, the meat juices, blood and fatty liquids which drop from the meat, fall into the troughs of the corrugations 24 and run down into the well 26 where they are absorbed by the absorbent pad 27. Pad 27 may preferably be a soft cellulose material, and may, if desired, be dyed a reddish brown or other suitable color to mask the discoloration of the pad which tends to result when the meat liquids are absorbed.

The forms of disposable packaging tray illustrated in FIGS. 1–3 and described above are entirely satisfactory for use where, in the packaging room and also in the display cabinet, the tray lies in a substantially level position. However, such trays may not be entirely satisfactory when used in a refrigerated display case having an inclined floor. In such cases, juices and other liquids may fall from the meats soon after the packaged tray has been placed in the display case and prior to the package acquiring a sufficiently low temperature to congeal the juices. If the angle of inclination of the tray is sufficient, some of the juices which fall during this period will flow away from, rather than toward, the centrally disposed well 26 and the absorbing pad 27. For such cases, a disposable packaging tray having the form shown in FIGS. 6, 7 and 8 would be preferable.

Referring now to FIGS. 6, 7 and 8, the packaging tray 50 there shown is formed (as by vacuum forming) entirely of thin plastic film, preferably polystyrene .007″–.008″ thick. The floor or bottom 51 of the tray 50 is corrugated, as best seen in FIG. 8, forming troughs 52 running lengthwise of the tray and terminating at each end in a well 53L and 53R. A pad of absorbent material 55L and 55R is inserted in each well. Each of the wells may have a recess in its walls running the length of the well for receiving the edges of the pad, thereby tending to retain the pad in the well. The floor or bottom 51 of the tray 50 is concave, the highest elevation being at the transverse center line.

When a tray 50 having the form shown in FIGS. 6, 7 and 8 is used, the juices and other liquids which fall from the meats or other products to the arched floor 51 of the tray in the packaging room during packaging, will run to the wells at the ends of the tray, leaving the troughs 52 clear of fluid. These juices and liquids will be absorbed by the pads 55L and 55R. When the tray 50 is subsequently placed in a refrigerated display case having an inclined floor, or when the tray 50 assumes an inclined position by reason of one end resting upon another tray, the juices and liquids which fall from the meat or other product to the floor prior to the packaging acquiring a sufficiently low temperature to congeal the liquids, will flow towards and run into the well at the low end of the tray, there to be absorbed by the pad 55L or 55R, leaving the troughs 52 clear. It will be seen then that the transparent plastic tray 50 of FIGS. 6, 7 and 8 will present a clean and attractive appearance even though the tray may acquire an inclined position.

An alternate form of tray which may be used where the tray is subject to being disposed in an inclined position is shown in FIGS. 9, 10 and 11. Tray 60 of FIGS. 9, 10, and 11 is formed of transparent plastic material preferably .007″–.008″ polystyrene. The floor 61 of the tray is ribbed lengthwise forming the troughs 62. The ribbed floor inclines downwardly from each end toward the center line and disposed at the center line, transversely across the width of the tray, is a well 63 having therein an absorbent pad 65. The side walls of the well 63 may be provided with recesses to aid in retaining the pad 65 in the well. The angle of downward inclination of floor 61 is preferably somewhat greater than the expected angle of downward inclination of the floor of the refrigerated display case into which the tray may be placed, so that even when the tray 60 is in such a display case any juices which fall from the packaged meat to the floor 61 of the tray will run toward and into the centrally-located transverse well 63 and be absorbed by the pad 65, leaving the transparent floor of the tray clear and attractive in appearance.

While the preferred embodiments of this invention have been described in some detail, it will be obvious to one skilled in the art that various modifications may be made without departing from the invention as hereinafter claimed.

Having described my invention, I claim:

1. A disposable packaging tray for meats, poultry, and the like, at least the floor of said tray being formed out of thin transparent plastic material, said floor being provided with two wells, one disposed along each of two opposite ends of said tray, said floor being arched between the wells and inclined downwardly from the arch toward each well, said floor having troughs therein running across the arch toward and terminating at each end in said wells, said wells receiving a pad of liquid-absorbing material, the well walls being provided with projections for retaining the absorbent pad placed therein.

2. A tray according to claim 1 characterized in that the retaining projections of each well are continuous, forming recesses in opposite positions which require the absorbing pad to be snap-pressed into the recesses and which prevent the pad from falling out when the tray is inverted.

References Cited in the file of this patent

UNITED STATES PATENTS

| | | |
|---|---|---|
| 2,206,694 | Greene | July 2, 1940 |
| 3,040,947 | Wells et al. | June 26, 1962 |
| 3,040,948 | Wells | June 26, 1962 |

UNITED STATES PATENT OFFICE
CERTIFICATE OF CORRECTION

Patent No. 3,155,303                                           November 3, 1964

Stanley O. Fenkel

It is hereby certified that error appears in the above numbered patent requiring correction and that the said Letters Patent should read as corrected below.

Column 1, line 68, for "displayed" read -- display --; column 2, line 43, before "alternatively" insert -- or --; line 56, for "cemeent" read -- cement --; same column 2, lines 66 to 69, strike out "In the form illustrated in the drawing, the bottom insert 23 is formed of a radially-disposed troughs leading to and inclined downwardly toward the well 26.".

Signed and sealed this 16th day of March 1965.

(SEAL)
Attest:

ERNEST W. SWIDER
Attesting Officer

EDWARD J. BRENNER
                                                            Commissioner of Patents